Figure 1:
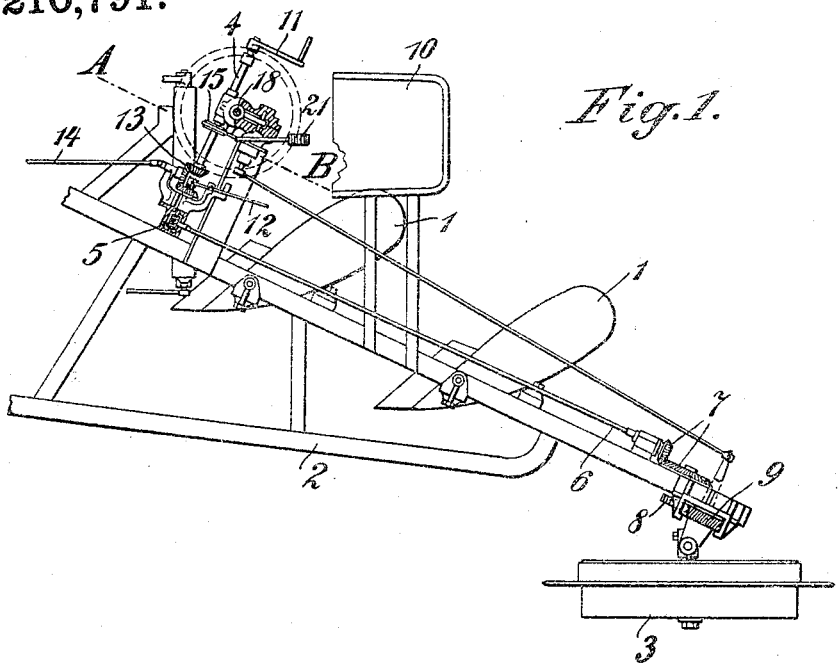

C. GLEICHE.
GEAR FOR ADJUSTING THE ELEVATION OF THE FRAMES OF MOTOR PLOWS.
APPLICATION FILED DEC. 1, 1915.

1,210,791.

Patented Jan. 2, 1917.

Witnesses:

Inventor:

UNITED STATES PATENT OFFICE.

CARL GLEICHE, OF BERLIN, GERMANY, ASSIGNOR TO STOCK MOTORPFLUG GESELLSCHAFT MIT BESCHRÄNKTER HAFTUNG, OF BERLIN, GERMANY, A CORPORATION OF GERMANY.

GEAR FOR ADJUSTING THE ELEVATION OF THE FRAMES OF MOTOR-PLOWS.

1,210,791.  Specification of Letters Patent.  Patented Jan. 2, 1917.

Application filed December 1, 1915. Serial No. 64,566.

*To all whom it may concern:*

Be it known that I, CARL GLEICHE, a subject of the German Emperor, resident at Berlin, in the Kingdom of Prussia, Germany, have invented certain new and useful Improvements in Gears for Adjusting the Elevation of the Frames of Motor-Plows, of which the following is a specification.

My invention relates to motor plows in which the elevation of the plow frame is adjustable with respect to the steering wheel or the wheel frame in general, the driving shaft of the gear for setting or adjusting the frame, is provided with locking means adapted to be released by the driver before he sets the driving shaft into motion, while after the adjustment of the elevation of the plow frame, the said shaft must again be locked. In order, however that parts of the gear should not be damaged, in particular when the gear for adjusting the elevation is driven from the engine of the plow, it has already been proposed to provide between the locking means for the driving shaft and the controlling lever or levers, for the operation of the said shaft, a positive connection so that the shaft can only be set into motion after its locking means has been released.

Operation has demonstrated that locking means of that kind entail not only comparatively complicated constructions which are a disadvantage particularly in connection with agricultural machines, but also frequently did not permit of obtaining the desired result. For instance, it occurs frequently that parts of the locking means are bent or alter the relative position requisite for proper operation owing the strains created during the operation of the plow, or for some other reasons. It may then happen that, for example, the controlling lever for the operation of the gear shaft, coöperating with a reversing gear, may be pushed over into the operative position while the shaft is still locked, whereby fractures in the gear may be produced.

In accordance with the invention, the aforesaid disadvantage is eliminated in a simple manner by providing upon the driving shaft for the elevating gear, a brake which is adapted to serve, both during raising and lowering of the frame, as a locking member and as a safety member during the operation of the shaft until the disengagement of the latter. The said brake has therefore a two-fold function to fulfil, namely, on the one hand, it acts as a locking means retaining the frame carrying the soil tilling implements in the desired position in opposition to the important forces brought into play during plowing, and on the other hand, it acts as a flexible coupling which, when the elevating gear is driven from the engine, has for its function to avoid a fracture of the gear elements should the locking have been maintained unintentionally. The brake acts in this manner both upon the upward and downward movements of the plow frame and therefore constitutes for both directions of adjustment, a reliable locking device excluding any danger of fracture.

A constructional form of the invention is illustrated in the accompanying drawing, in which—

Figure 2:
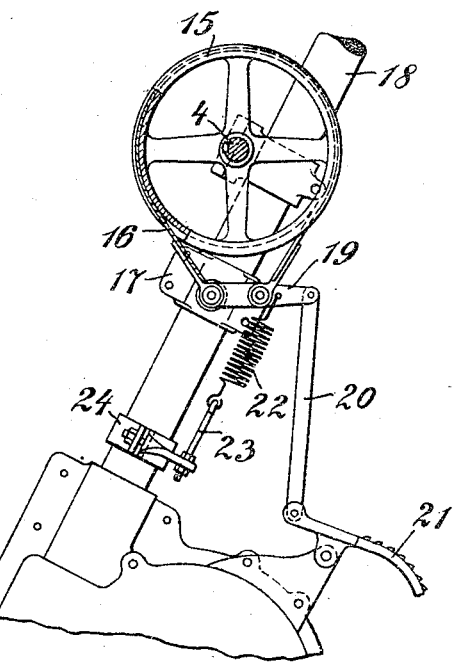

Figure 1 is a partly sectioned plan of the rear portion of a motor plow. Fig. 2 is a section taken on line A—B of Fig. 1. (Fig. 2 is drawn on a larger scale than Fig. 1).

The plow frame 2 carrying the plow shares 1 is adapted to have its elevation varied in known manner with respect to the steering wheel 3 by rotating from the shaft 4 through the medium of a worm wheel 5, a shaft 6 and a bevel gear 7, the pinion 8 engaging with a rack 9 connected with the said steering wheel. The shaft 4 can be set into rotary motion from the driver's seat 10, by the handle 11 or the controlling lever 12. The latter coöperates in known manner with a reversing gear 13 connected with a shaft 14 driven from the engine which is not illustrated.

Upon the shaft 4, a brake 15 is mounted which in the illustrated construction, has been constructed as a hand brake. One end of the band 16 of the brake, is secured to a lug 17 provided on a sleeve 18 for the steering shaft of the plow. For the sake of simplicity it has been assumed in Fig. 1 that the said sleeve is in a vertical position. The other end of the band 16 is connected with an arm 19 rockable upon the lug 17, the free end of which arm is connected with a foot pedal 21 through the medium of a connecting link 20. Furthermore, the arm 19 is connected with a spring 22 the other end of which is secured, by means of an adjustable screw 23, to a lug 24 mounted on the sleeve 18.

When the driver desires to raise or lower the plow frame 2 he releases the brake 15, 16 by treading upon the pedal 21, whereupon by means of the handle 11 or the lever 12, he sets the shaft 4 into motion. After having obtained the desired elevation, the lever 12 is disengaged or the handle 11 usually returning automatically to its inoperative position under the action of a spring, is no longer depressed, while at the same time the lever 12 is left free so that the brake 15, 16 is rendered operative under the action of the spring 22 which, at the same time, pushes the lever 21 up into its inoperative position, and the shaft 4 is brought to a standstill. Even if the pedal 21 has been released before the driving means for the shaft 4 has been disengaged, fractures in the gear cannot take place owing to the flexibility of the brake 15, 16.

The brake 15, 16 may be constructed in any desired manner. It is particularly advantageous, however, to use a brake which in one direction of rotation of the shaft 4 acts to a greater extent thereupon than in the other direction, for which purpose a band brake may serve, as illustrated in the accompanying drawing. This brake opposes to the downward movement of the plow frame 2 during which the weight of this frame and the downward thrust of the plow shares coöperate to a considerable extent, a greater resistance than to the upward movement of the said frame so that for a stronger call for braking action finds response in a greater braking pressure being available. Since the brake pressure, however, is adjustable by a displacement of the screw 23, all the forces acting in the gear of the plow described hereinbefore, may be taken into account.

The described plow comprises, owing to the use of a brake upon the shaft 4, a visible, readily accessible and simple locking means for the said shaft and the whole elevating gear, which do not necessitate any special attendance and yet operate in an absolutely safe manner.

Having fully described my invention, what I claim as new and desire to secure by Letters Patent, is:

1. A brake for plows comprising in combination with an adjustable plow frame, a gear for adjusting the elevation of said frame and a soil tilling implement on said frame, a driving shaft, a band brake upon said driving shaft, a steering shaft for said plow, a sleeve surrounding said shaft, a lug on said sleeve to which the end of said brake band is secured and a foot pedal for releasing said brake.

2. A brake for motor plows comprising in combination with a gear for adjusting the frame, a soil tilling implement carried on said frame and a driving shaft provided on said frame, means for raising and lowering said frame, and means for increasing the braking action during the lowering of said frame substantially as described and for the purpose set forth.

In testimony whereof I affix my signature in presence of two witnesses.

CARL GLEICHE.

Witnesses:
HENRY HASPER,
ARTHUR SCHROEDER.